Aug. 17, 1948. A. M. CANDY 2,447,113
HOLDING MECHANISM FOR WELDING STUD FERRULES
Filed May 5, 1947
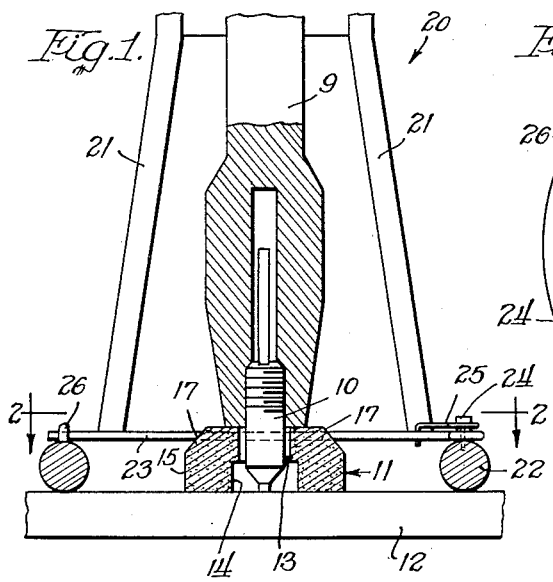
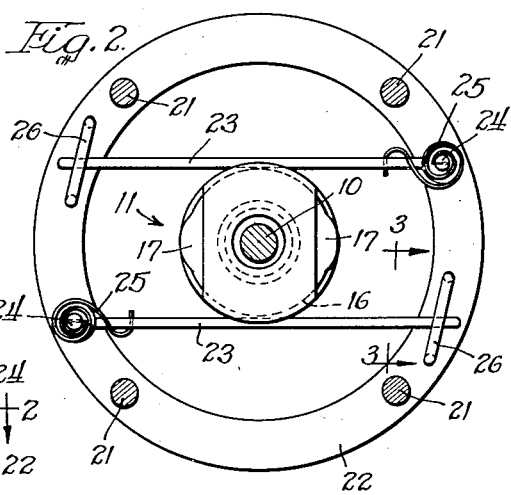
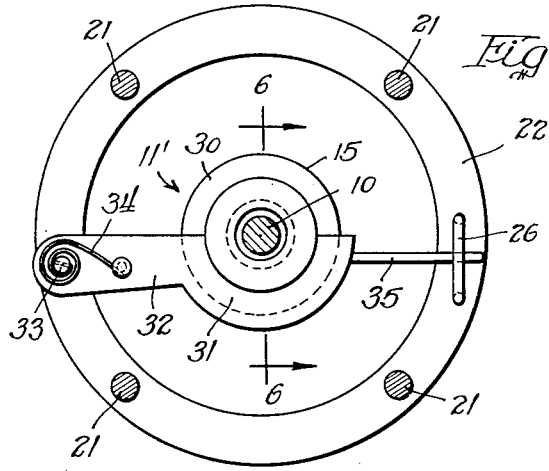
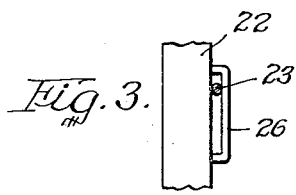
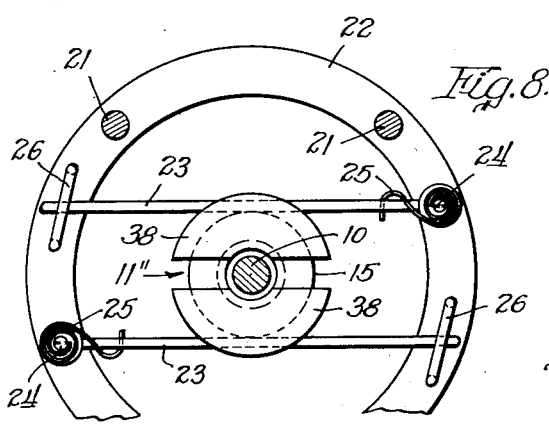
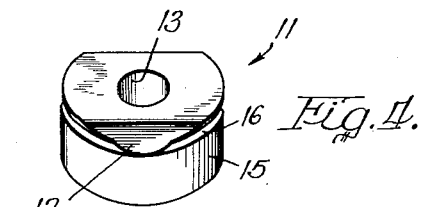
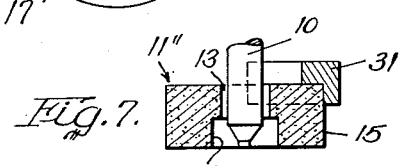
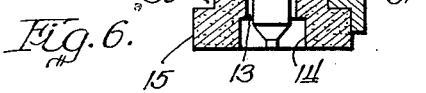
Inventor:
Albert M. Candy.
By Brown, Jackson, Boettcher
& Dienner
Attys.

Patented Aug. 17, 1948

2,447,113

UNITED STATES PATENT OFFICE 2,447,113

HOLDING MECHANISM FOR WELDING STUD FERRULES

Albert M. Candy, La Grange, Ill., assignor, by mesne assignments, to National Cylinder Gas Company, Chicago, Ill., a corporation of Delaware Application May 5, 1947, Serial No. 746,073

8 Claims. (Cl. 219—4)

My invention relates, generally, to holding mechanisms for welding stud ferrules, and it has particular relation to the provision of means for holding ferrules in operative relation to welding studs while the welding operation is being performed. The present invention can be employed in conjunction with the stud welding gun mechanism disclosed in my co-pending application Serial No. 700,054 filed September 23, 1946, with which may be used the studs disclosed in my co-pending applications Serial Nos. 674,994 and 683,293, filed respectively June 7, 1946, and July 13, 1946, the latter of which is now Patent No. 2,441,257, dated May 11, 1948, all of these applications being assigned to the assignee of this application.

Among the objects of my present invention are: To hold a welding stud ferrule in operative relation with respect to the welding stud in a stud welding gun while the welding operation is being performed; to engage the ferrule from one or both sides for holding the same in position; to grip the ferrule resiliently to hold the same in place; to employ a single arm or a pair of arms on opposite sides of the ferrule for gripping the same; to mount the arms rockably on the frame which supports the welding gun at one end and to guide the other end or ends and limit their movement relative to the frame; to provide for automatically gripping the ferrule merely by moving the arms over inclined surfaces thereof after which the ferrule is rotated relative to the arms so as to move the inclined surfaces out of engagement therewith; and to employ a chuck jaw on each arm, the inner surface of which conforms to the shape of the outer cylindrical surface of the ferrule for engaging and gripping the same.

Other objects of my invention will, in part, be obvious and in part appear hereinafter.

Accordingly, my invention is disclosed in the embodiments thereof shown in the accompanying drawing and it comprises the features of construction, combination of elements and arrangement of parts which will be exemplified in the constructions hereinafter set forth and the scope of the application of which will be indicated in the appended claims.

For a more complete understanding of the nature and scope of my invention, reference may be had to the following detailed description taken together with the accompanying drawing, in which:

Figure 1 is a view, partly in side elevation and partly in section showing the chuck of a stud welding gun and a portion of the associated frame which supports the same and engages the work piece, the welding stud being shown in the chuck with the welding stud ferrule therearound;

Figure 2 is a detail sectional view taken along the line 2—2 of Figure 1;

Figure 3 is a detail sectional view taken along the line 3—3 of Figure 2;

Figure 4 is a perspective view of one form of welding stud ferrule that can be employed in practicing my invention;

Figure 5 is a view, similar to Figure 2, but showing a single arm of somewhat different character for engaging a welding stud ferrule having a different outer configuration from that shown in Figure 4;

Figure 6 is a detail sectional view taken on the line 6—6 of Figure 5 and showing one form of welding stud ferrule;

Figure 7 is a view similar to Figure 6 but showing a different form of welding stud ferrule; and Figure 8 is a view, similar to Figure 2, and showing a chuck jaw on each of the arms, the inner surface of which conforms to the shape of the outer cylindrical surface of the welding stud ferrule with which it is arranged to be used.

Referring now particularly to Figures 1 and 2 of the drawing, it will be observed that the reference character 9 designates a chuck of a stud welding gun for holding a stud 10 therein. The stud 10 extends down through a welding stud ferrule that is indicated, generally, at 11. The ferrule 11 rests on a work piece 12 to which the stud 10 is to be welded. The ferrule is formed of suitable heat resisting material, such as fire clay, porcelain, lava or the like, and it has a central opening 13 through which the stud 10 can project. The lower end of the aperture 13 is enlarged, as indicated at 14, to permit expansion of the molten weld metal during the performance of the welding operation.

As shown in Figure 4, the ferrule 11 has a generally outer cylindrical surface 15 near the upper edge of which there is located a peripheral groove 16, the purpose of which will be described presently. Portions of the upper end of the ferrule 11 are cut away to provide inclined surface 17 for facilitating the gripping of the ferrule 11. The particular welding stud ferrule 11 is described and claimed in my co-pending application Serial No. 746,074 filed May 5, 1947 and assigned to the assignee of this application.

The stud welding gun is supported by a frame, a part of which is indicated, generally, at 20. The frame 20 includes legs 21 which may be secured, as by welding, to a ring 22 that is arranged as shown to contact the upper surface of the work piece 12. While four legs have been illustrated, it will be understood that three may be employed if desired or that a larger number than four can be used if it is considered desirable.

With a view to gripping the welding stud ferrule 11 automatically a pair of arms 23, in the form of rods, are pivoted at 24 on opposite sides of the ring 22 and above its upper surface. Spiral springs 25 are employed to bias the arms 23 toward each other and into gripping engagement with the ferrule 11. Stop means, in the form of loops 26 of rod-like material, are secured to the ring 22 and extend from its upper surface and cooperate with the adjacent ends of the arms 23 for limiting their movement relative to the ring 22. They serve as stops for limiting the movement of the arms 23 toward each other in the absence of the ferrule 11. Also they hold the arms 23 in such position that, when the frame 20 of the stud welding gun is moved downwardly with the stud 10 in the chuck 9 to position the former in the ferrule 11 for welding to the work piece 12, the arms 23 will be spread by moving over the downwardly and outwardly inclined surfaces 17 of the ferrule 11 to register with the peripheral groove 16. Thereafter, either the ferrule 11 is turned with the stud welding gun and frame 20 remaining stationary or vice versa so that the arms 23 interfit with the groove 16 in the portions thereof between the inclined surfaces 17 and serve to securely hold the ferrule 11 in place. If preferred, the ferrule may be placed around the stud end and moved into position to be retained by arms 23 before the gun is placed on the welding location.

In Figures 5 and 6 of the drawing another form of welding stud ferrule is indicated generally at 11'. The ferrule 11' differs from the ferrule 11 in that it is provided with a plain cylindrical outer surface. This construction is provided for cooperating with a correspondingly shaped chuck jaw 31 which forms an integral part of an arm 32, which may be plate-like in character, and which may be pivoted at 33 on the ring 22. A spiral spring 34 may be employed for urging the arm 32 in such a direction as to cause the ferrule 11' to bear against the stud 10 and thus it is held in place. A finger 35 extends from the chuck jaw 31, as shown, for interfitting with the stop member 26 which, as shown in Figure 3 and described hereinbefore, is in the form of a loop that limits the movement of the finger 35 and thus holds the chuck jaw in operative position.

A further modification of the ferrule construction is indicated, generally at 11" in Figure 7. The ferrule 11" is similar to the ferrule 11' except that the peripheral recess 30 is omitted and the outer cylindrical surface 15 extends the full vertical length of the ferrule 11'. The chuck jaw 31 interfits with the outer cylindrical surface 15 of the ferrule 11' to hold the same in place.

In Figure 8 of the drawing it will be observed that a chuck jaw 38 is secured, as by welding, to each of the arms 23 and that a ferrule, such as the ferrule 11", is employed around the welding stud 10. The chuck jaws 38 are generally segmental in shape and their inner surface conforms to the cylindrical outer surface 15 of the ferrule 11". It will be understood that the ferrule 11' can be employed with the chuck jaws 38. Also it will be understood that the ferrule 11 can be employed, it being turned so that the inclined surfaces are out of principal register with the chuck jaws 38.

Since certain further changes can be made in the foregoing constructions and different embodiments of the invention can be made without departing from the spirit and scope thereof, it is intended that all matters shown in the accompanying drawing and described hereinbefore shall be interpreted as illustrative and not in a limiting sense.

I claim as my invention:

1. For combination with a stud welding gun having a chuck for holding a stud within a welding stud ferrule, a frame through which the chuck is movable for supporting the gun and engaging the work surface, an arm rockably mounted at one end on one side of said frame and extending transversely of the longitudinal axis of the stud for engagement with the ferrule, the other end of said arm extending to the other side of said frame, stop means on said frame cooperating with said other end of said arm to limit its movement relative to said frame, and spring means biasing said arm toward the ferrule for holding the same in operative position with respect to the stud.

2. For combination with a stud welding gun having a chuck for holding a stud within a generally cylindrical welding stud ferrule, a frame through which the chuck is movable for supporting the gun and including a ring for engaging the work surface, an arm pivotably mounted at one end on one side of said ring and extending transversely of the longitudinal axis of the stud, a chuck jaw carried by said arm the inner surface of which conforms to the shape of the outer cylindrical surface of the ferrule, the other end of said arm extending to the other side of said ring, stop means in the form of a loop on said ring cooperating with said other end of said arm to limit its movement relative to said ring, and spring means biasing said arm toward the ferrule to cause said chuck jaw to engage and hold the same in operative position with respect to the stud while the welding operation is being performed.

3. For combination with a stud welding gun having a chuck for holding a stud within a welding stud ferrule, a frame through which the chuck is movable for supporting the gun and engaging the work surface, a pair of arms each rockably mounted at one end on one side of said frame and extending transversely and on opposite sides of the longitudinal axis of the stud for engagement with the ferrule, the other end of each arm extending to the other side of said frame, stop means on said frame individual to and cooperating with the other end of each of said arms to limit movement thereof relative to said frame, and spring means biasing each arm toward the ferrule for holding the same in operative position with respect to the stud.

4. The invention, as set forth in claim 3, wherein the arms are rod-like and are pivoted on the frame on opposite sides thereof, and a spring is coiled about the pivot axis of each arm for biasing the same.

5. The invention, as set forth in claim 4, wherein the ends of the arms away from their pivots extend across the frame, and the stop means therefor extend upwardly therefrom.

6. The invention, as set forth in claim 3, wherein the stop means are correlated with the rockably mounted arms and spring means therefor to permit said arms to spread apart as they are moved downwardly along inclined surfaces on the ferrule and to grip and hold the same when it is turned to rotate the inclined surfaces out of engagement therewith.

7. For combination with a stud welding gun having a chuck for holding a stud within a generally cylindrical welding stud ferrule, a frame through which the chuck is movable for supporting the gun and including a ring for engaging the work surface, a pair of arms each pivotably mounted at one end on one side of said ring and extending transversely of the longitudinal axis of the stud, a check jaw carried by each arm the inner surface of which conforms to the shape of the outer cylindrical surface of the ferrule, the other end of each arm extending to the other side of said ring, stop means in the form of a loop on said ring individual to and cooperating with the other end of each of said arms to limit movement thereof relative to said ring, and spring means biasing each arm toward the ferrule to cause said chuck jaws to engage and hold the same in operative position with respect to the stud while the welding operation is being performed.

8. The invention, as set forth in claim 7, wherein the ends of the arms away from their pivots extend across the upper surface of the ring, and the loop individual thereto extends upwardly therefrom.

ALBERT M. CANDY.

REFERENCES CITED

The following references are of record in the file of this patent:

UNITED STATES PATENTS

| Number | Name | Date |
|---|---|---|
| 2,416,915 | Evans | Mar. 4, 1947 |